United States Patent
Golander et al.

(10) Patent No.: US 10,466,922 B2
(45) Date of Patent: Nov. 5, 2019

(54) ACCELERATING CONCURRENT ACCESS TO A FILE IN A MEMORY-BASED FILE SYSTEM

(71) Applicant: NETAPP, INC., Sunnyvale, CA (US)

(72) Inventors: Amit Golander, Tel Aviv (IL); Sagi Manole, Petah Tikva (IL); Boaz Harrosh, Hertzlia (IL)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 15/085,479

(22) Filed: Mar. 30, 2016

(65) Prior Publication Data

US 2017/0160980 A1  Jun. 8, 2017

Related U.S. Application Data

(60) Provisional application No. 62/263,948, filed on Dec. 7, 2015.

(51) Int. Cl.
*G06F 3/06* (2006.01)

(52) U.S. Cl.
CPC .......... *G06F 3/0643* (2013.01); *G06F 3/0623* (2013.01); *G06F 3/0673* (2013.01)

(58) Field of Classification Search
CPC .... G06F 3/0643; G06F 3/0623; G06F 3/0673; G06F 17/30171; G06F 17/30327; G06F 17/30961
See application file for complete search history.

(56) References Cited

U.S. PATENT DOCUMENTS

| | | | | |
|---|---|---|---|---|
| 2014/0089282 A1* | 3/2014 | Sampathkumar | ... | G06F 17/30386 707/705 |
| 2014/0310317 A1* | 10/2014 | Spillane | ............ | G06F 17/30091 707/803 |
| 2014/0330802 A1* | 11/2014 | Preslan | ............. | G06F 17/30067 707/704 |
| 2015/0058554 A1* | 2/2015 | Gupta | ................... | G06F 3/0619 711/114 |
| 2015/0324386 A1* | 11/2015 | Calder | .............. | G06F 17/30876 707/649 |
| 2016/0077761 A1* | 3/2016 | Stabrawa | .............. | G06F 3/0604 711/172 |

OTHER PUBLICATIONS

"Btree vs LSM" by GitHub, Sep. 11, 2014. Available at <https://github.com/wiredtiger/wiredtiger/wiki/Btree-vs-LSM>.*

(Continued)

*Primary Examiner* — Ann J Lo
*Assistant Examiner* — Jane Wei
(74) *Attorney, Agent, or Firm* — Klein, O'Neill & Singh, LLP (57) ABSTRACT

A method, apparatus and product for accelerating concurrent access to a file in a memory-based file system. The method comprising receiving a request issued by a program, for accessing a file stored in a memory-based file system; and subject to the request being associated with data modification of data within the file, and subject to the modification not necessitating change in a structure of a data structure used for content lookup for the file, acquiring a lock to the file to the program, wherein the lock is acquired in a shared mode.

20 Claims, 4 Drawing Sheets

(56) References Cited

OTHER PUBLICATIONS

Kishore, Aseem. "How to Change the Last Modified Date, Creation Date, and Last Accessed Date for Files and Folders". Last edited Oct. 10, 2014. Available at <http://www.online-tech-tips.com/computer-tips/how-to-change-the-last-modified-date-creation-date-and-last-accessed-date-for-files-and-folders/>.*

"Btree vs LSM" by GitHub, Sep. 11, 2014. Available at <https://github.com/wiredtiger/wiredtiger/wiki/Btree-vs-LSM> (Year: 2014).*

* cited by examiner

ACCELERATING CONCURRENT ACCESS TO A FILE IN A MEMORY-BASED FILE SYSTEM

CROSS-REFERENCE TO RELATED APPLICATION

This application claims the benefit of U.S. Provisional Application No. 62/263,948 filed Dec. 7, 2015, entitled A METHOD FOR ACCELERATING CONCURRENT ACCESS TO A SINGLE FILE IN MEMORY-BASED FILE SYSTEMS, which is hereby incorporated by reference in its entirety without giving rise to disavowment.

TECHNICAL FIELD

The present disclosure relates to a memory based file systems in general, and to a method and apparatus for providing concurrent access to files in particular.

BACKGROUND

File storage is traditionally implemented as non-volatile storage media such as magnetic hard-disk drive (HDD) or Flash-based solid-state drive (SSD), and employed as a peripheral device to one or more computing devices. Such technologies provide affordable capacity, but at latency longer in many orders of magnitudes as compared to the latency of volatile memory such as dynamic random-access memory (DRAM).

Newly developed storage media technologies are currently becoming available, which overcome this problem. For example, a Non-Volatile Dual In-line Memory Module (NVDIMM) is a computer random access memory (RAM) that retains data even when electrical power is stopped due to normal system shutdown, an unexpected power loss, system crash or any other reason. Currently the main types of available NVDIMM cards include: NVDIMM-F which is a Flash device that resides on the memory interconnect, typically accessed via a block driver, and has NAND Flash attributes such as high capacity but slow access times; and NVDIMM-N which is a byte-addressable memory-mapped device, typically accessed at memory or near-memory speeds.

NVDIMMs may be used for implementing a file system which may be accessed in the same manner as volatile memory, and can therefore be useful in improving the performance of computer programs.

BRIEF SUMMARY

One exemplary embodiment of the disclosed subject matter is a computer-implemented method comprising: receiving a request issued by a program, for accessing a file stored in a memory-based file system; and subject to the request being associated with data modification of data within the file, and subject to the modification not necessitating change in a structure of a data structure used for content lookup for the file, acquiring a lock to the file to the program, wherein the lock is acquired in a shared mode.

Another exemplary embodiment of the disclosed subject matter is a computerized apparatus having a processor, the processor being adapted to perform the method above.

Yet another exemplary embodiment of the disclosed subject matter is a computer program product comprising a non-transient computer readable storage medium retaining program instructions, which program instructions when read by a processor, cause the processor to perform a method comprising: receiving a request issued by a program, for accessing a file stored in a memory-based file system; and subject to the request being associated with data modification of data within the file, and subject to the modification not necessitating change in a structure of a data structure used for content lookup for the file, acquiring a lock to the file to the program, wherein the lock is acquired in a shared mode.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

One technical problem relates to reducing processing delays associated with memory access. The use of NVDIMM, which significantly eliminates access time and network latency delays raises new challenges, since processing delays which were previously negligible may become significant bottlenecks in executing computer programs. The disclosed subject matter may be utilized to reduce or overcome such bottlenecks. The disclosed subject matter may relate to efficient file access in file systems, and in memory-based file system in particular. A file may be represented in a file system using a data structure. For example, in UNIX™ systems this data structure is referred to as inode, containing a reference to the data or the content of the file, as well as its metadata, including information such as file size, timestamps, or the like. When a processing entity (e.g., process, software thread or the like), referred to hereinbelow as thread, needs to read a file's content or a portion thereof, it traditionally asks to acquire a lock to the file's inode in shared mode, also referred to as a shared lock. Once the shared lock is granted, the thread can perform a content lookup, for example via a tree structure referred to by the inode, and read the actual file content from the data units, e.g., from the blocks pointed at by the relevant part of the tree structure. Multiple threads can thus simultaneously hold a shared lock to the same file, and therefore read it simultaneously. However, when a thread is required to modify a file, by changing, adding content or removing portions of the file, it needs to acquire the file's lock in exclusive mode, also referred to as an exclusive lock. The exclusive lock ensures that no other thread can hold a lock to the same file, neither in shared nor in exclusive mode. Thus, if a thread holds an exclusive lock to a file, no other thread may obtain a lock to the file in any mode. Further, an exclusive lock cannot be granted as long as a lock (either shared or exclusive) is held by another thread.

This mechanism implies serial access to each file, including the log file which keeps registry of all file accesses in the system. Thus, if a first thread needs to access a first file, and a second thread needs to access a second file at a small time difference, the log file needs to be updated twice, which necessitates one thread to wait for the other to release an exclusive lock for the log file, thus possibly causing a delay.

This delay may be insignificant relatively to the durations of read/write operations as long as the file is stored on peripheral persistent storage. However, with currently available technologies, such as memory-based file systems, in which addressable memory is implemented as part of the computing platform itself, this lock mechanism creates an unnecessary delay in accessing files.

In some exemplary embodiments, a memory-based file system according to the disclosed subject matter may retain at least a portion of the data block in a computerized memory, which may be volatile memory or persistent memory. In some cases, the memory-based file system may utilize a hybrid of both an addressable memory device and a persistent non-addressable storage. As an example, some data blocks of a specific file may be retained in an addressable memory that is used as a first tier of the file system, while the remaining data blocks may be retained in a lower tier, non-addressable, storage, such as a hard disk.

Another technical problem relates to the data and metadata of a file, being handled together, i.e., using a single lock. Thus, if a thread acquired an exclusive lock to a file, access is restricted not only to the file contents but also to the meta data of the file, which will not enable other threads to access the meta-data, not even through a shared lock.

A memory-based file system may enable direct access by threads with memory-mapped I/O to the persistent media rather than to a cache. The access may be performed by requesting to read from or write to an address attributed to the persistent memory. This approach is referred to as Direct Access (DAX), and is implemented, for example, in Linux XFS-DAX™ file system. However, this approach increases the probability of lock contentions, as locks may be requested upon page-faults that are relevant to the address space of the persistent memory. Thus, there is a need for an improved lock mechanism.

One technical solution comprises a method that distinguishes between different modification requests, such that for a potential majority of the modification requests a shared lock may be granted where prior art techniques required the grant of an exclusive lock, thus eliminating a significant bottleneck in the file access.

For that purpose, a data structure representing a content of a file may be used. The data structure may contain pointers to different areas of the file, and is designed such that its internal structure is not changed often. For example, a log-tree with relatively wide and shallow hierarchy may be used for representing a file. In some exemplary embodiments, the data structure may be traversed until reaching a target data unit, which contains the content that is being accessed. In some exemplary embodiments, shared locks for modification requests may often be provided instead of exclusive locks, thus enabling simultaneous grant of modification access (e.g., write, store, delete and truncate) and one or more additional accesses (e.g., modification access or non-modifying accesses, such as read, load, and the like). In some exemplary embodiments, only in the potentially rare cases in which the structure of the data structure may be changed, for example if the log-tree's depth is increased or decreased, an exclusive lock may be granted, since read operations cannot be guaranteed to complete successfully if the data structure is modified while the data structure is traversed.

In some exemplary embodiments, the lock may be obtained before traversing the data structure representing the content of the file and released after traversal of the data structure is completed. Hence, the lock is not held when metadata of the file is potentially examined or when the content of the data unit is accessed. As a result, the lock may be held for a shorter time period and reduce the potential for lock contentions and waiting time until a contention clears.

Another technical solution relates to separating a lock to the data from a lock to the metadata of a file. Instead of having a single lock, the disclosed subject matter may employ two separate locks: a lock on the metadata, also referred to as a metadata lock, and a lock on the content of the file, also referred to as a data lock. When an access is performed to the metadata, the metadata lock may be acquired. When an access is performed to the content of the data, the data lock is acquired. In some exemplary embodiments, some operations, such as truncate or append calls which may change the structure of the data structure may have to acquire both locks, but many operations that only access the data and potentially modify content of data units, do not, and can therefore acquire only the data lock without acquiring the metadata lock. This may allow accessing metadata and data at the same time, for instance reading the content while modifying the metadata. Additionally or alternatively, instead of acquiring the metadata lock on modification access, data access may only acquire the data lock. However, in operations that potentially modify metadata as well as the data, such as modifying the structure of the data structure, the metadata lock may be acquired to prevent potential race.

In some exemplary embodiments, some metadata fields may not be protected by any lock. Instead, such metadata fields may be updated using a single atomic instruction. It will be noted that as the atomic instruction may operate directly on the memory, without using intermediate volatile storage, such atomic instruction may achieve its purpose. In some exemplary embodiments, atomic instructions may be used to update fields represented using one word (e.g., 8 bytes) or portion thereof.

In some exemplary embodiments, atomic and non-protected modification access may be performed when modifying a timestamp such as last access timestamp or last modification timestamp, as in such metadata fields, even in case there is a race in which two updates occur concurrently, the correct result is the last update in time.

In some exemplary embodiments, some or all of the timestamps in the metadata may be modified using non-atomic and non-protected modification accesses.

One technical effect of utilizing the disclosed subject matter is the provisioning of a method for eliminating bottlenecks occurring in traditional file systems when any write operation to a file requires an exclusive lock, such that the write operation is delayed until all shared locks are released, and no shared lock can be granted before the exclusive lock is released.

Another technical effect of utilizing the disclosed subject matter is the elimination of the need to acquire a lock for the metadata of a file in many cases, thus saving time and avoiding unnecessary lock acquisitions which may delay access operations.

Figure 1A:
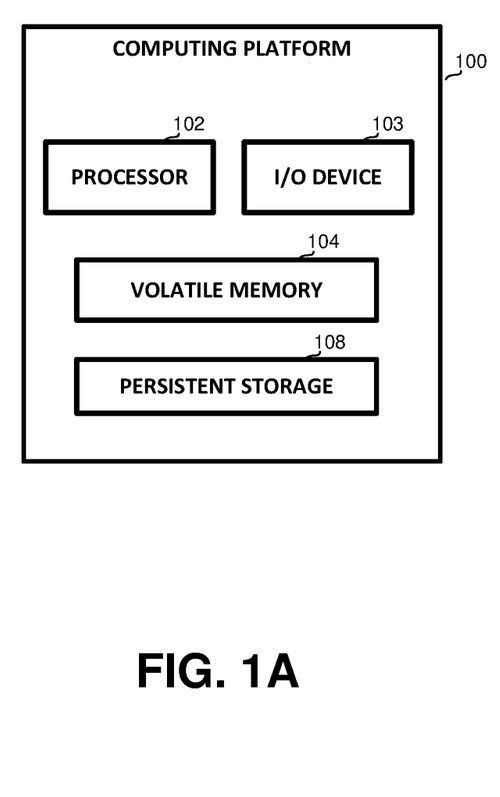
FIG. 1A shows a schematic block diagram of a computing platform using traditional storage devices.
Figure 1B:
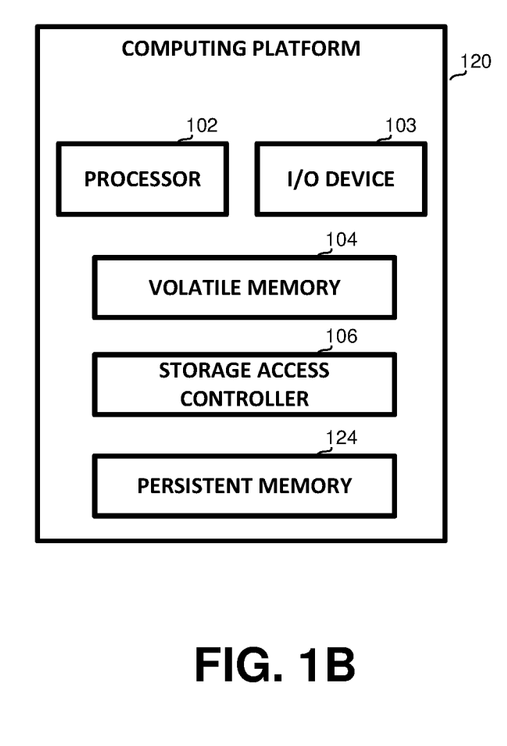
FIG. 1B shows a schematic block diagram of a computing platform comprising a non-volatile memory device.

Referring now to FIGS. 1A and 1B showing traditional and current computing environments, respectively. FIG. 1A shows a schematic block diagram of a computing platform 100 using traditional storage devices.

Computing Platform 100 comprises Processor 102 which may be a Central Processing Unit (CPU), a microprocessor, an electronic circuit, an Integrated Circuit (IC) or the like. Processor 102 may be utilized to perform computations required by Computing Platform 100 or any of it subcomponents.

In some exemplary embodiments of the disclosed subject matter, Computing Platform 100 may comprise an Input/Output (I/O) Device 103. I/O Device 103 may be utilized to provide output to and receive input from a user. I/O Device 103 may be a peripheral device connected to computing platform 100, such as a keyboard, a speaker, a microphone, a display, or the like.

Computing Platform 100 may comprise Volatile Memory 104, such as Random Access Memory, cache memory, combination thereof, or the like, which may be used during execution of one or more programs. Additionally, computing platform 100 may be associated with Persistent Storage 108 which may or may not be comprised directly by Computing Platform 100. In some exemplary embodiments, Persistent Storage 108 may be accessed via a bus, may be accessed as a peripheral device of Computing Platform 100, may be accessed over a network connection, or the like. Persistent Storage 108 may be a non-volatile computer-readable medium used for long-term data storage such as a hard disk drive, a Flash drive, or the like.

Referring now to FIG. 1B, showing a schematic block diagram of a Computing Platform 120, in accordance with some exemplary embodiments of the disclosed subject matter. Computing Platform 120 may comprise Processor 102 and I/O Device 103 similarly to Computing Platform 100. In addition, Computing Platform 120 may comprise Volatile Memory 104 as in FIG. 1A, and may also comprise one or more Persistent Memory 124, which may also be referred to as non-volatile memory, such as Dual In-line Memory Module (DIMM), non-volatile DIMM (NVDIMM) card or brick over silicon photonics or PCI express (PCIe), Infiniband, or the like. Persistent Memory 124 may be used for long-term storage, such as by retaining a file system comprising one or more files. In some exemplary embodiments, Persistent Memory 124 may be configured to provide direct random access to Processor 102 using addressable space.

Computing platform 120 may comprise Storage Access Controller 106 may be configured to provide access to storage component, such as Persistent Memory 124, for example by granting locks to Persistent Memory 124, in accordance with the disclosed subject matter. In some exemplary embodiments, Controller 106 may be implemented in hardware, software, combination thereof, or the like. In some exemplary embodiments, Controller 106 may be a module of an operating system or of a file system platform, implemented in software, potentially retained on computer readable memory and configured to cause Processor 102 to perform desired actions, such as computation, acquiring and releasing of locks, or the like.

Thus, Computing Platform 120 may have a single tier of accessing persistent storage (e.g., Persistent Memory 124), which may be accessed directly and does not require additional tiers, such as cache memory used for accelerating access to peripheral or remote storage.

Computing platform 120 may also comprise or have access to one or more persistent storage, such as 108 of FIG. 1A, which may be used as secondary storage devices in addition to Persistent Memory 124.

In some exemplary embodiments, in order to achieve good utilization of Persistent Memory 124, efficient usage of locking mechanism may be implemented so that delays that went unnoticed in traditional systems such as depicted in FIG. 1A will not harm performance under an architecture such as depicted in FIG. 1B.

Figure 2A:
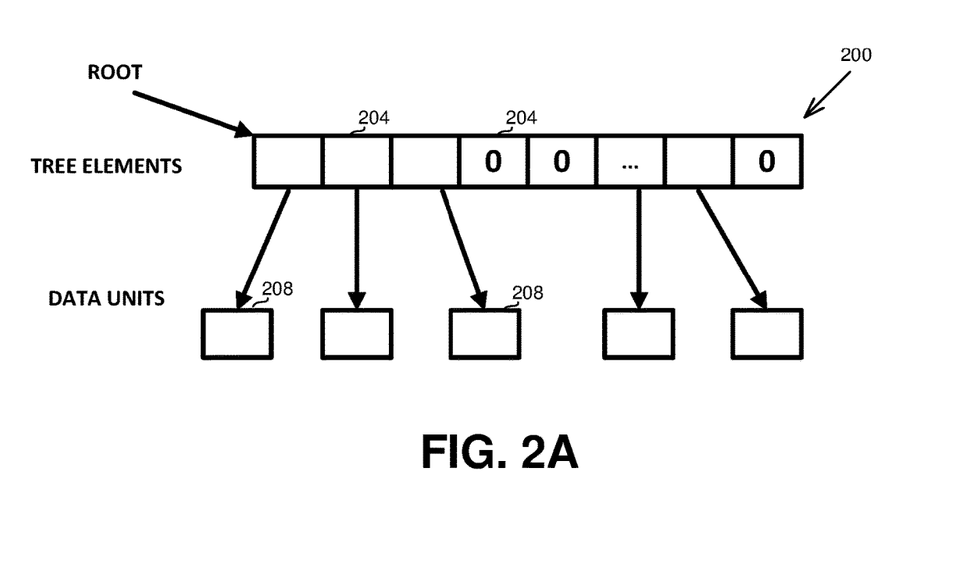
FIGS. 2A and 2B show an exemplary structure of a file implemented on a non-volatile memory device before and after addition of data, in accordance with some exemplary embodiments of the subject matter.
Figure 2B:
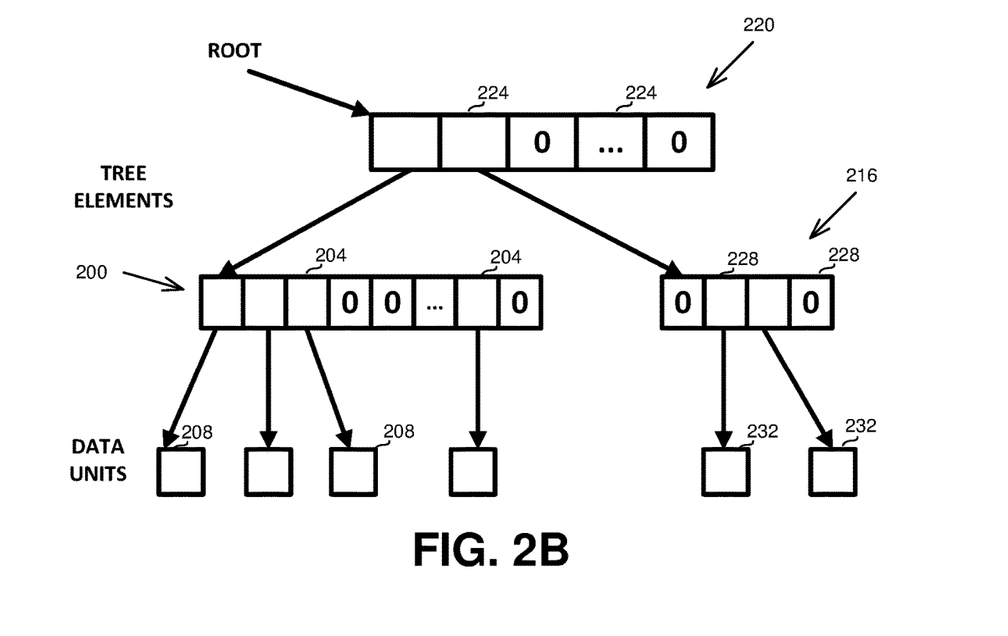

Referring now to FIGS. 2A and 2B, showing an exemplary structure of a file implemented on a computer-readable memory device before and after addition of data, respectively, in accordance with some exemplary embodiments of the subject matter. The present disclosure focuses on a structure similar to the inode pointer structure of the UNIX™ system, in which the inode metadata record utilizes a tree-based structure to retain pointers to data units of content of the file. However, it will be appreciated that multiple other implementations may be used under the same principles and that the disclosed data structure does not limit the scope of the disclosure.

The data structure is generally a shallow tree comprising nodes, wherein each node is a tree element, such as Tree Element 200. Each tree element may contain one or more Pointers 204, each Pointer 204 pointing at a data unit 208 comprising data. Additionally or alternatively, a Pointer 204 may be set at a NULL value representing that the data unit does not exist or is a NULL data unit (e.g., all zeros data unit).

The maximal addressable file size available without increasing the tree depth is:

$$size_{data\_unit} \times \left(\frac{size_{tree\_element}}{size_{pointer}}\right)^{tree\_depth}.$$

By selecting the tree element size to be large relatively to the pointer size, a relatively shallow tree may be generally used. In an exemplary embodiment, each Data Unit 208 and each tree element is 4 KB in size, and a pointer retained in 208 requires 8 byte. Thus, in such exemplary tree of a depth one, the maximal file size that may be represented is equal to $$4 \text{ KB} \times \left(\frac{4 \text{ KB}}{8 \text{ B}}\right)^1 = 2 \text{ MB}.$$

Therefore, a single tree element with a depth of 1 may provide for files up to 2 MB in size.

FIG. 2B shows the same tree after the addition of data, which necessitated the addition of another level of the tree. Thus, Tree Element 220 comprises Pointers 224 used to point to two tree Elements (200 and 216) in a second level, wherein each of such tree elements comprises Pointers 204 and 228 to Data Unit 208 and 232. A two level tree as shown in FIG. 2B can thus represent a file of size up to $$4 \text{ KB} \times \left(\frac{4 \text{ KB}}{8 \text{ B}}\right)^2 = 1 \text{ GB},$$

which may be large enough for most files used during normal operation of a computer. For larger files, three levels may be used to retain files of up to 512 GB, thereby allowing for most files to be retained using no more than three levels.

The data structure representing a file may rarely have to undergo a depth-changing update such as addition or removal of information. For example, if the data unit addressed at (1 GB/8 B)+1-th location is accessed for a file of size 1 GB or less, the data structure depth may be increased to three and the structure may be changed. Similarly, if all data units after the address that is equivalent to (2 MB/8 B) are deleted, the depth of the tree may be modified to one.

In some exemplary embodiments, assuming a file being represented by the structure depicted in FIG. 2A is modified by attempting to access a data unit retained after the first 2 MB, the structure may be modified by increasing the depth to two, as is depicted in FIG. 2B. Tree Element 200 is retained as is but instead of being at the Root, it is moved to the second level of the structure. A different root element is created (Tree Element 220), which points to Tree Element 200 from its first pointer, thereby preserving the logical location of Data Units 208 pointed to by Tree Element 200. A second Pointer 224 is used to point to a new tree element (216) that provides access to newly created data units, such as Data Units 232, which caused the file to exceed the 2 MB size limit. If such data units are later on deleted, similarly, the structure may be modified by replacing the root with 200 and returning to the structure depicted in FIG. 2A.

In some exemplary embodiments, when an access that is configured to cause a structure change, is performed, exclusive lock may be used. In all other cases, whenever a thread needs to access the file, whether to read or to write, a shared lock may be acquired. Such policy may enable multiple concurrent read or write commands to a single file.

It will be appreciated that providing shared locks for writing at the same data unit may be prevented by the application issuing the write commands, such as by the application maintaining its own locking mechanisms. However, from the perspective of the file system, in order to avoid corruption of the file system (as opposed to content of files in the file system), exclusive locks may be acquired and used only for structure-modifying accesses.

Figure 3A:
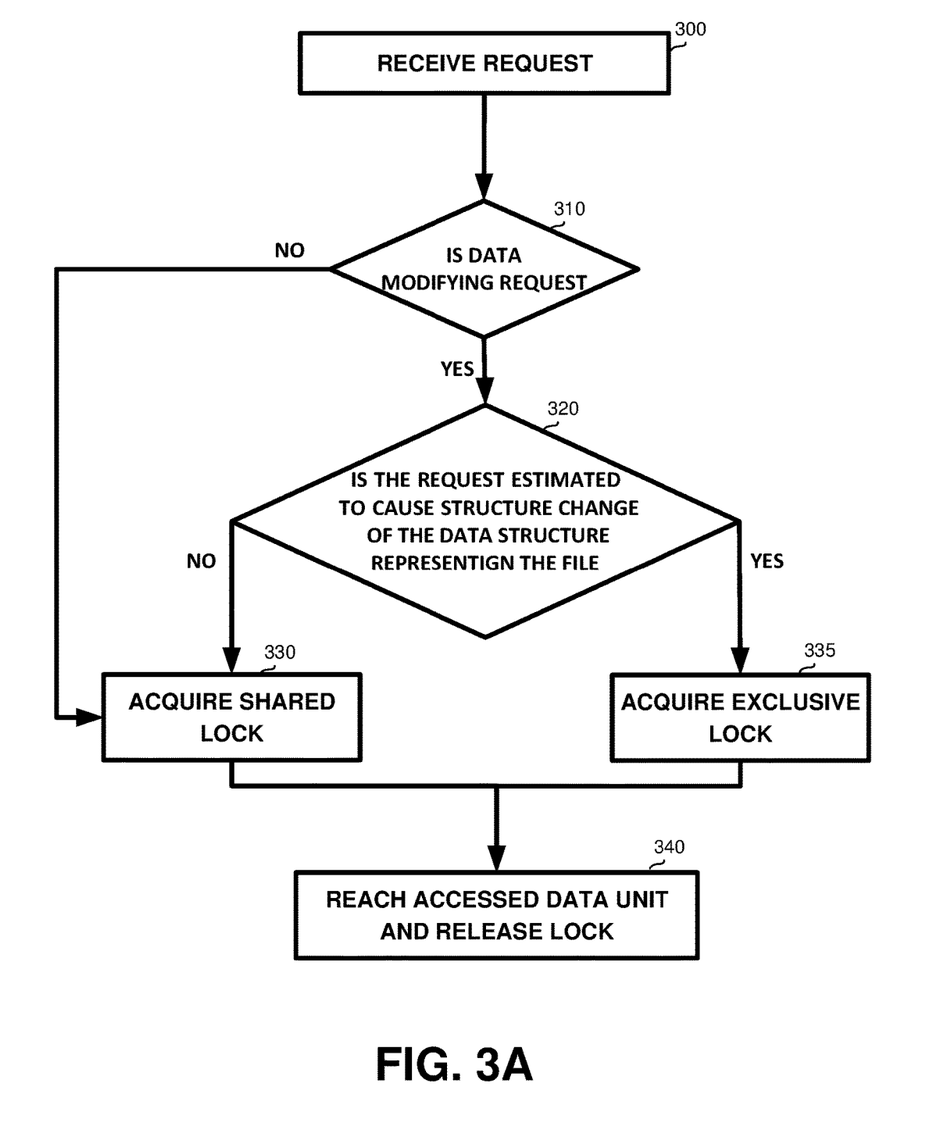
FIG. 3A shows a flowchart of steps in a method for acquiring a lock to a file upon a file-access request submitted by a thread in a memory-based file system, in accordance with some exemplary embodiments of the subject matter.

Referring now to FIG. 3A, showing a flowchart of steps in a method for acquiring a lock to a file upon a file-access request submitted by a thread in a memory-based file system, in accordance with some exemplary embodiments of the subject matter.

On Step 300 a request to access a file may be received. The request may be received from an executed thread, such as a user program or a system program. The request may be received as a system call for accessing the file for read, write or truncate operations.

On Step 310 it may be determined whether the request is a data preserving request, such as a read request, or a data modifying request, such as a write request. If the request is not configured to modify the content of the file, a shared lock may be acquired (Step 330).

Otherwise, if the request is a data modifying request, Step 320 may be performed. On Step 320 it may be estimated whether the request may cause a change in the structure of the data structure being accessed. In some exemplary embodiments, the estimation may be based on an approximation. Additionally or alternatively, the estimation may be based on precise calculations. For example, in case a write request accesses an existing data unit (e.g., updating the content), it may be determined that the request will not lead to a change in the data structure. As another example, in case of a truncate request, it may be estimated as a rule that such requests may change the structure without performing any computation. As such request may be a rare request, such approximation may be useful and may not hinder performance. Additionally or alternatively, if the request accesses a non-existing data unit, it may be determined whether the data unit is currently accessible through the current structure. If it is, it may be determined that the request will not modify the structure. Otherwise, the request is expected to cause a structure change and shifting of tree elements. As another example, deleting an existing data unit that is the last data unit may reduce the file size below a threshold causing a structure change. In case it is estimated that the request causes or potentially causes a structure change, an exclusive lock may be acquired (Step 335), otherwise a shared lock may be sufficient (Step 330).

In some exemplary embodiments, structure modification may be delayed when not necessary to be performed immediately. For example, in case the structure is modified in view of a reduction in size, the structure may remain as is, and a shared lock may be acquired. The file system may periodically perform batch operation in which the modification is implemented. Additionally or alternatively, in some embodiments, the file system may avoid changing the structure in case of a reduction in size. Furthermore, in other to improve performance, the structure may be designed to be modified as rarely as possible, such as by imposing an initial size useful for about 30%, 40%, or 50% of the files or more, and a second size after a single modification, useful for about 70%, 80%, or 90% of the files or more.

On Step 340, after the lock is acquired, the data structure may be traversed and potentially modified, in order to reach the accessed data unit. Once the data unit is reached, the lock may be released.

It will be appreciated that in some exemplary embodiments, file in the persistent memory may be accessed directly through the use of memory mapping. For example, in UNIX™ in addition to the file commands as disclosed above, a file may also be accessed by memory-accessing commands. For example in UNIX, systems, mmap command may be used to map a file from the file system to memory to be accessed through system calls that manipulate memory and without using system calls that are related to the file system.

Figure 3B:
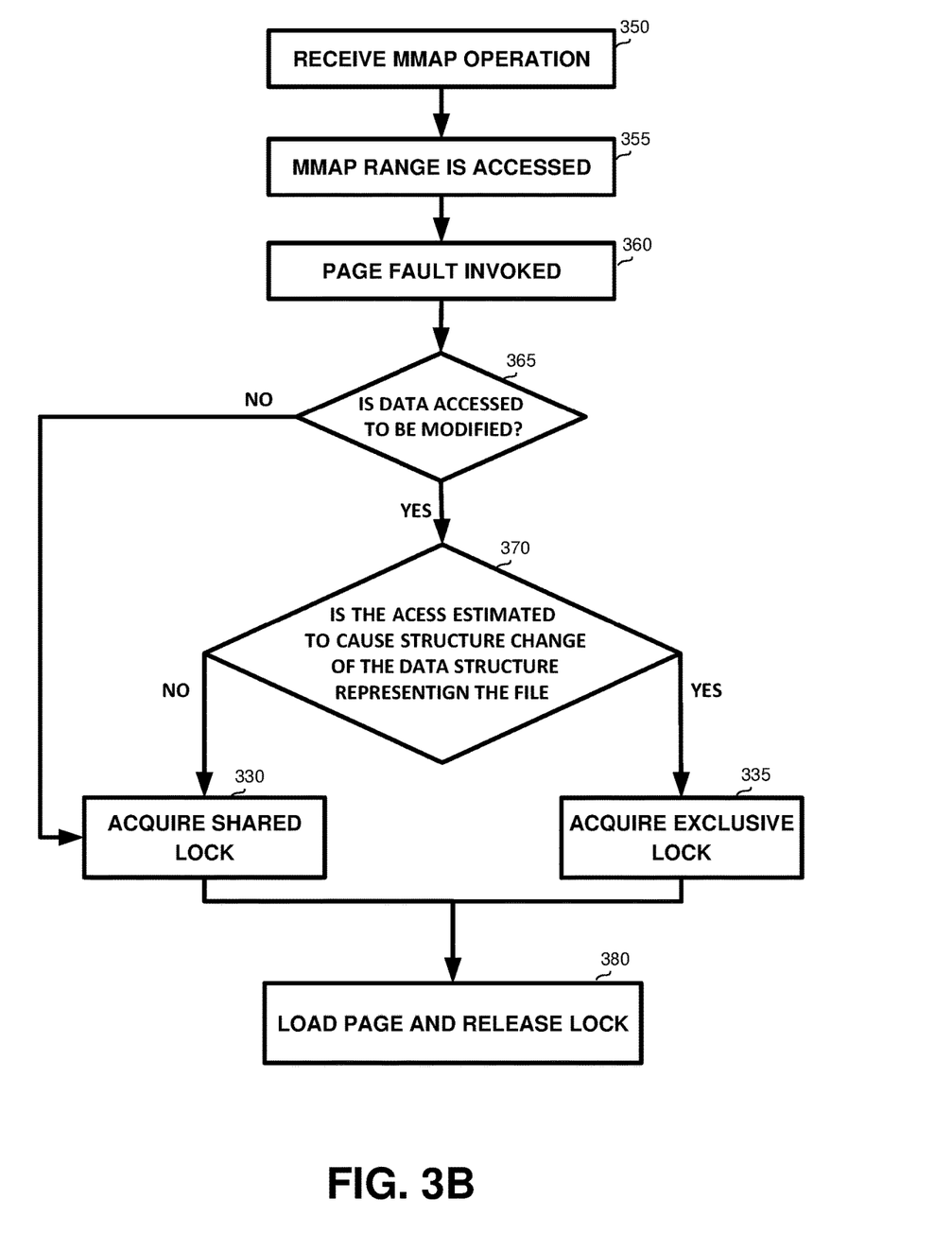
FIG. 3B shows a flowchart of steps in a method for acquiring a lock to a file upon a memory based access request to a memory mapped file, in accordance with some exemplary embodiments of the subject matter.

Referring now to FIG. 3B, showing a flowchart of steps in a method for acquiring a lock to a file upon a memory based access to a memory mapped file, in accordance with some exemplary embodiments of the subject matter.

On Step 350 an mmap operation may be received, for example from a user program or a system program. The mmap operation may define a file to be mapped to memory. A range of addresses, such as defined using an initial virtual address and a length, may be defined as representing the file. In some exemplary embodiments, the mapping may be performed in a lazy manner, so as the content of the file is not read to memory upon performing the mmap operation, but rather upon first access thereto.

On Step 355, the mmap range may be accessed. The access may be a load access (e.g., load machine-level instruction configured to load data from memory), a store access (e.g. store machine-level instruction configured to store data to memory), or the like.

On Step 360, in case the data was not previously accessed, the access instruction may trigger a page fault. The page fault may be handled by loading the data into a page from the persistent memory, to allow access thereto, via load and store instructions and similar memory-manipulating instructions. In some exemplary embodiments, a page cache may be filled with the content and used to simulate memory mapping of the file. Additionally or alternatively, direct access (DAX) mapping may be performed for the respective address range. However, in both cases, at some point, data is retrieved from the file system and during content lookup phase (e.g., traversal of the data structure representing the content) a lock may be acquired.

If the access is a non-modifying access, such as a load instruction (365), a shared lock may be acquired (330). Additionally or alternatively, in case of a modifying access, it may be determined whether such access is estimated to cause a structure change (370). If a structure change is not estimated, a shared lock may be acquired (330). Otherwise, an exclusive lock may be acquired for the lookup phase (335).

On Step 380, the page is loaded and the lock is released. In some exemplary embodiments, in case of a load instruction, the page may be marked as a read-only page, thereby causing a page fault if the page is accessed for updating.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
   mapping a file of a memory-based file system to an address range of a persistent memory, without reading content of the file for the memory-based file system to access the file from the persistent memory, the memory-based file system stored at the persistent memory;
   maintaining a data structure for representing the file by the memory-based file system at the persistent memory, the data structure being hierarchical and used for file content lookup and includes a data unit for storing file data accessible by a data lock and a metadata unit storing file metadata with a first portion accessible by a metadata lock and a second portion that is updateable by an atomic operation accessible without a lock;
   wherein the metadata lock is acquired without the data lock when a request is to access the first portion of the metadata, the data lock is acquired without the metadata lock when the request is to access the data without modification of a structure of the data structure, and both the data lock and the metadata data lock are acquired when the request modifies the first portion of the metadata and the structure of the data structure;
   estimating, based on a request type and prior to acquiring at least one of the data lock and the metadata lock, whether the request will result in modification of file data and change the structure of the data structure, wherein the structure is unchanged for certain request types after existing content of the data unit is updated; and
   using the data lock and the metadata lock in a shared mode when data modification for the request results in change to the structure of the data structure and the data modification is delayed, based on the estimating.

2. The method of claim 1, wherein the data modification is executed as a batch operation.

3. The method of claim 1, wherein the data structure is a log tree comprising at least one tree element and the request is a write request that does not cause a tree element within the log tree to shift.

4. The method of claim 1, wherein the request is associated with a page fault generated by a machine-level store instruction for the file system that supports direct access to the persistent memory.

5. The method of claim 1, wherein the second portion of the metadata are metadata fields that are not protected by the metadata lock.

6. The method of claim 5, wherein metadata fields not protected by the metadata lock are updated using the atomic operation on a memory location without acquiring a lock.

7. The method of claim 1, wherein a timestamp metadata of the second portion of the metadata for the file is updated without a lock using the atomic operation.

8. A system, comprising:
   a memory containing a non-transitory machine readable medium comprising machine executable code having stored thereon instructions; and a processor coupled to the memory, the processor configured to execute the machine executable code to:
   map a file of a memory-based file system to an address range of a persistent memory, without reading content of the file for the memory-based file system to access the file from the persistent memory, the memory-based file system stored at the persistent memory;
   maintain a data structure for representing the file by the memory-based file system at the persistent memory, the data structure being hierarchical and used for file content lookup and includes a data unit for storing file data accessible by a data lock and a metadata unit storing file metadata with a first portion accessible by a metadata lock and a second portion that is updateable by an atomic operation accessible without a lock;
   wherein the metadata lock is acquired without the data lock when a request is to access the first portion of the metadata, the data lock is acquired without the metadata lock when the request is to access the data without modification of a structure of the data structure, and both the data lock and the metadata data lock are acquired when the request modifies the first portion of the metadata and the structure of the data structure;
   estimate, based on a request type and prior to acquiring at least one of the data lock and metadata lock, whether the request will result in modification of file data and change the structure of the data structure, wherein the structure is unchanged for certain request types after existing content of the data unit is updated; and
   use the data lock and the metadata lock in a shared mode when data modification for the request results in change to the structure of the data structure and the data modification, executed as a batch operation, is delayed, based on the estimate.

9. The system of claim 8, wherein in response to the request, a lock for the data structure is acquired before traversing the data structure and released after traversal is completed.

10. The system of claim 8, wherein the data structure is a log tree comprising at least one tree element and the request is a write request that does not cause a tree element within the log tree to shift.

11. The system of claim 8, wherein the request is associated with a page fault generated by a machine-level store instruction for the file system that supports direct access to the persistent memory.

12. The system of claim 8, wherein the second portion of the metadata are metadata fields that are not protected by the metadata lock.

13. The system of claim 12, wherein metadata fields not protected by the metadata lock are updated using the atomic operation on a memory location without acquiring a lock.

14. The system of claim 8, wherein a timestamp metadata of the second portion of the metadata for the file is updated without a lock using the atomic operation.

15. A non-transitory machine-readable storage medium having stored thereon instructions for performing a method, comprising machine executable code which when executed by at least one machine, causes the machine to:
   map a file of a memory-based file system to an address range of a persistent memory, without reading content of the file for the memory-based file system to access the file from the persistent memory, the memory-based file system stored at the persistent memory;
   maintain a data structure for representing the file by the memory-based file system at the persistent memory, the data structure being hierarchical and used for file content lookup and includes a data unit for storing file data accessible by a data lock and a metadata unit storing file metadata with a first portion accessible by a metadata lock and a second portion that is updateable by an atomic operation accessible without a lock;
   wherein the metadata lock is acquired without the data lock when a request is to access the first portion of the metadata, the data lock is acquired without the metadata lock when the request is to access the data without modification of a structure of the data structure, and both the data lock and the metadata data lock are acquired when the request modifies the first portion of the metadata and the structure of the data structure;
   estimate, based on a request type and prior to acquiring at least one of the data lock and metadata lock, whether the request will result in modification of file data and change the structure of the data structure, wherein the structure is unchanged for certain request types after existing content of the data unit is updated; and
   use the data lock and the metadata lock in a shared mode when data modification for the request results in change to the structure of the data structure and the data modification, executed as a batch operation, is delayed, based on the estimate.

16. The storage medium of claim 15, wherein a timestamp metadata of the second portion of the metadata for the file is updated without a lock using the atomic operation.

17. The storage medium of claim 15, wherein the data structure is a log tree comprising at least one tree element and the request is a write request that does not cause a tree element within the log tree to shift.

18. The storage medium of claim 15, wherein the request is associated with a page fault generated by a machine-level store instruction for the file system that supports direct access to the persistent memory.

19. The storage medium of claim 15, wherein the second portion of the metadata are metadata fields that are not protected by the metadata lock.

20. The storage medium of claim 19, wherein metadata fields not protected by the metadata lock are updated using the atomic operation on a memory location without acquiring a lock.

* * * * *